(12) United States Patent
Hasegawa et al.

(10) Patent No.: US 7,084,767 B2
(45) Date of Patent: Aug. 1, 2006

(54) VEHICLE-MOUNTED APPARATUS AND METHOD FOR OUTPUTTING INFORMATION ABOUT ARTICLES IN VEHICLE

(75) Inventors: Shinichi Hasegawa, Kanagawa (JP); Hiroshi Amano, Tokyo (JP); Takumi Arie, Kanagawa (JP)

(73) Assignee: Sony Corporation, Tokyo (JP)

( * ) Notice: Subject to any disclaimer, the term of this patent is extended or adjusted under 35 U.S.C. 154(b) by 121 days.

(21) Appl. No.: 10/822,067

(22) Filed: Apr. 8, 2004

(65) Prior Publication Data

US 2004/0263334 A1 Dec. 30, 2004

(30) Foreign Application Priority Data

Apr. 11, 2003 (JP) ............................. 2003-108069

(51) Int. Cl.
*G08B 13/14* (2006.01)
(52) U.S. Cl. ................. 340/572.1; 340/539.1; 340/539.13; 340/933; 340/902
(58) Field of Classification Search ............. 340/539.1, 340/539.13, 933, 902, 572.1
See application file for complete search history.

(56) References Cited

U.S. PATENT DOCUMENTS 5,892,441 A * 4/1999 Woolley et al. ........ 340/539.26

FOREIGN PATENT DOCUMENTS

JP 2003-030707 A 1/2003

\* cited by examiner

*Primary Examiner*—Daryl C Pope
(74) *Attorney, Agent, or Firm*—Finnegan, Henderson, Farabow, Garrett & Dunner, L.L.P.

(57) ABSTRACT

A vehicle-mounted apparatus includes a radio frequency identification (RFID) reading unit for reading an RFID signal from an RFID tag attached to an article placed in a vehicle, a system controller for determining the nature of the article in the vehicle on the basis of the read RFID signal, and an user interface unit for outputting the nature. The system controller determines whether the article placed in the vehicle is dangerous or not. If the article is determined to be dangerous, the system controller outputs information for warning a user via the user interface unit.

12 Claims, 7 Drawing Sheets

VEHICLE-MOUNTED APPARATUS AND METHOD FOR OUTPUTTING INFORMATION ABOUT ARTICLES IN VEHICLE

BACKGROUND OF THE INVENTION

1. Field of the Invention

The present invention relates to vehicle-mounted apparatuses used in vehicles including a passenger car, a transportation car and, in particular, to a vehicle-mounted apparatus for identifying an identification tag attached to an article.

2. Description of the Related Art

In techniques for identifying articles, barcode recognition and optical character recognition (OCR) have been widely used. The barcode recognition is advantageous in that a tag attached to a surface of an article is inexpensive, but is disadvantageous in that a barcode reader is expensive and the amount of information included in the tag is limited. The OCR is used affordably, but it has a problem with the accuracy of reading. Recently, therefore, radio frequency identification (RFID) for identifying individual information from tags put on human bodies or articles by radio waves via antennas has commanded attention.

In the RFID having no built-in battery, tags that are composed of ID memory and communication circuitry, such as CMOS chips and small loop-antennas, are attached to articles. A reader emits radio waves (charged waves) to the tags so that the tags receive energy required for responses. The excited tags acquire, for example, electric power by electromagnetic induction and then transmit ID data. The reader that changes its mode to the receive mode after transmitting the radio waves to the tags reads the ID data, and recognizes ID information included in the tags. Examples of transmission of the RFID signals include an electrostatic coupling type, an electromagnetic coupling type, and a microwave type. In the microwave transmission that utilizes radio waves within a microwave band, a maximum communication range reaches 5 to 10 meters at present.

The application of RFID technology to merchandise control in the retail market is spreading fast. For example, reading product information, such as a producer country, a producer, a product name, and a serial number, from RFID tags attached to various articles by a reader is technically feasible already. In the near future, it is quite conceivable that RFID tags will be attached to all articles in the world. There is a technique for acquiring information about whether a passenger rides in a vehicle from an identification tag, such as an RFID tag, to confirm passengers' rides. (See, for example, Japanese Unexamined Patent Application Publication No. 2003-30707, in particular, pages 3 to 4, and FIG. 1.)

Various kinds of articles may be placed in a passenger space of a vehicle. In a general passenger car, for example, cigarette packs, lighters, precision devices, such as a camera, or a personal computer, pieces of media, such as a compact disc (CD), and a MiniDisc (MD), or food items, such as an alcoholic drink, or a carbonated beverage, may be placed. Leaving a dangerous article, for example, a lighter, in the passenger space may cause an accident, such as a fire. If an article, such as a precision device or a food item, is left in a passenger space of a parked vehicle under the hot sun, the article will be damaged, rotten, or burst. Moreover, bringing alcoholic drinks in a passenger space may be banned in countries or districts, such as the United States, having particular regulations.

For home-delivery vehicles or general transportation vehicles, all descriptions of articles may be placed in a vehicle (in a passenger space and a storage space). Keeping track of whether those delivery articles are placed in the passenger space and the storage space is a demanding task and consumes much time of working hours for delivery. The patent document exhibited above discloses only a technique for keeping track of passengers' riding and does not mention handling of articles according to location information or conditions of the vehicle at all.

SUMMARY OF THE INVENTION

The present invention is achieved to solve the above technical problems. It is an object of the present invention to provide a vehicle-mounted apparatus enabling a user to readily keep track of articles placed in a vehicle.

It is another object of the present invention to provide a user with information about articles according to a location of a vehicle or conditions.

According to a first aspect of the present invention, a vehicle-mounted apparatus includes a reading unit for reading an identification signal from an identification tag attached to an article placed in a vehicle and a control unit for determining the nature of the article in the vehicle on the basis of the read identification signal and for outputting the nature. The control unit may determine whether the article corresponding to the identification signal is dangerous or not when the article is placed in the vehicle, and the control unit may output information for warning a user if the article is determined to be dangerous.

The vehicle-mounted apparatus may further include a location information measurement unit for identifying a location of the vehicle and the control unit may determine the nature on the basis of the location identified by the location information measurement unit. This is preferable in terms of providing the user with information according to, for example, regulations of a particular area.

According to a second aspect of the present invention, a vehicle-mounted apparatus acquires article information corresponding to an identification signal read from an identification tag attached to an article placed in a vehicle by an article information acquiring unit, acquires location information about the current position of the vehicle by a location information acquiring unit, and outputs the location information and the article information in combination by an outputting unit. The vehicle-mounted apparatus may read the identification signal from the identification tag attached to the article by an identification signal reading unit and acquire the article information corresponding to the read identification signal from a storing unit. The vehicle-mounted apparatus may acquire geographic data based on the location information by a geographic data acquiring unit and output the geographic data and the article information in combination by the outputting unit.

According to a third aspect of the present invention, a vehicle-mounted apparatus acquires article information corresponding to an identification signal read from an identification tag attached to an article placed in a vehicle by an article information acquiring unit, acquires geographic data that is used for indicating a current position of the moving vehicle by a geographic data acquiring unit, and displays the geographic data and the article information in combination by a display unit. The vehicle-mounted apparatus may acquire location information about the current position of the vehicle by a location information acquiring unit, and select a delivery route for delivering the article on the basis of the location information by a delivery route selecting unit. The display unit may display the geographic data and the selected delivery route in combination.

According to a fourth aspect of the present invention, a method for outputting information about an article placed in a vehicle. The method includes the steps of acquiring an identification signal from an identification tag attached to the article placed in the vehicle, acquiring article information from the identification signal, acquiring location information of the vehicle, and outputting the article information and the location information in combination. The method may further include the steps of acquiring geographic data on the basis of the location information, and outputting the article information and the geographic data in combination.

According to the present invention, the user is able to readily keep track of articles placed in a vehicle and acquire article information according to a location of the vehicle or conditions.

The term delivery in this specification may include pickups as needed.

DESCRIPTION OF THE PREFERRED EMBODIMENTS

Preferred embodiments will now be described with reference to the drawings.

Figure 1:
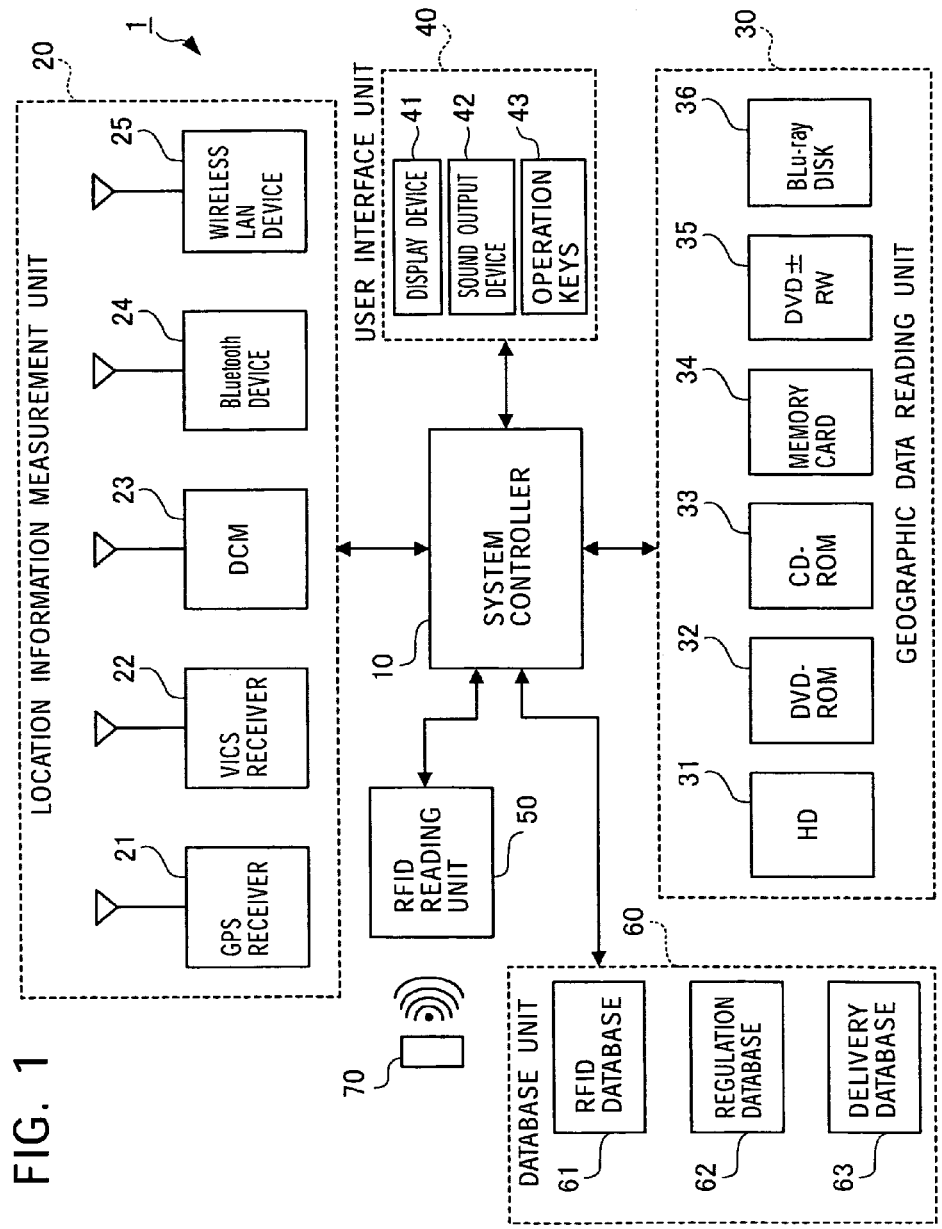
FIG. 1 is an illustration for explanation of a vehicle-mounted apparatus according to an embodiment of the present invention.

FIG. 1 is an illustration for explanation of a vehicle-mounted apparatus according to an embodiment of the present invention. A vehicle apparatus 1 to which the embodiment is applied has: a system controller 10 that controls the overall system; a location information measurement unit 20 that measures location information about a current position of a vehicle; a geographic data reading unit 30 that reads geographic data of a corresponding area from a predetermined storage medium in accordance with positioning data from the location information measurement unit 20; a user interface unit 40 that is used for input by a user and for displaying the result; a radio frequency identification (RFID) reading unit 50 that identifies RFID tags 70 of articles placed in a vehicle (a passenger space and a storage space); and a database unit 60 that is connected to the system controller 10 and stores RFID information of the articles and other information required for running various applications.

FIG. 1 illustrates the vehicle-mounted apparatus 1 including these elements individually, but the vehicle-mounted apparatus 1 may have a structure in which a plurality of devices is logically assembled through a network. These elements (devices) shown in FIG. 1 need not be disposed in the same package. The vehicle-mounted apparatus 1 may be viewed as a form of a computer apparatus (computer system).

The location information measurement unit 20 has: a global positioning system (GPS) receiver 21 that receives radio waves from at least three GPS satellites and measures a location of a vehicle two-dimensionally (in latitude and longitude); a vehicle information and communication system (VICS) receiver 22 that receives traffic information about accidents or congestion by using beacons arranged on streets or by frequency modulation (FM) multiplex broadcasting; a data communication module (DCM) 23 that is a vehicle-mounted communication module and obtains information providing service externally; a Bluetooth device 24 that performs short-range radio communication in a predetermined (2.45 GHz) waveband; and a wireless LAN device 25 that performs communication to predetermined access points over a transmission line, such as radio waves or infrared rays, other than cables in conformity with the IEEE 802.11b standard.

In the location information measurement unit 20, the GPS receiver 21 functions as main measurement means. If the measurement depends solely on the GPS receiver 21, errors included in measured location information are unacceptable in most cases because of geographic conditions in a communication position of a vehicle. Therefore, VICS reception by the VICS receiver 22 and the like are also used in combination with the GPS receiver 21. For the VICS technique, beacons used for spot communication are mounted every, for example, 2 to 5 km, on streets in order to provide information about a communication position of a vehicle, the shape of an intersection, or varying traffic information. The GPS receiver 21 and the VICS receiver 22 enable only receipt of transmitted information, while the DCM 23, the Bluetooth device 24, and the wireless LAN device 25 enable interactive communications.

The geographic data reading unit 30 has a hard disk (HD) 31, which is widely used as a magnetic recording medium, a DVD-ROM 32, a CD-ROM 33, which are optical disks, a memory card 34, which is a recording medium using semiconductor memory, a DVD±RW 35, which is a rewritable optical disk supporting both DVD+R/RW and DVD-R/RW, and a BLu-ray disk 36, which is a next-generation optical disk. The geographic data reading unit 30 may be used as a recording medium. The individual recording media may be used alone or in combination.

The user interface unit 40 has a display device 41 that displays geographic data read from the geographic data reading unit 30 and the result of article identification from the RFID reading unit 50 to provide a user (e.g. driver) with them, a sound output device 42 that outputs sound to guide or warn the user, and operation keys 43 used for various input by the user.

The database unit 60 includes an RFID database 61 that stores RFID information on articles, a regulation database 62 that stores information on various regulations, and a delivery database 63 that stores information on delivery operation when the apparatus is applied to a distribution system. The database unit 60 may be installed in the vehicle-mounted apparatus 1 or may be disposed at a distant location over a network. When installed in the vehicle-mounted apparatus 1, the database unit 60 is updated by reading a portable predetermined storage medium on a regular basis. The hardware, such as the storage medium, may be shared between the database unit 60 and the geographic data reading unit 30 in part or in entirety. The RFID database 61 included in the database unit 60 stores various article information, including a product name, a producer, a serial number, and a category, corresponding to individual RFIDs of articles in list form. The system controller 10 queries the RFID database 61 and retrieves necessary information corresponding to the RFID signals read by the RFID reading unit 50.

Figure 2:
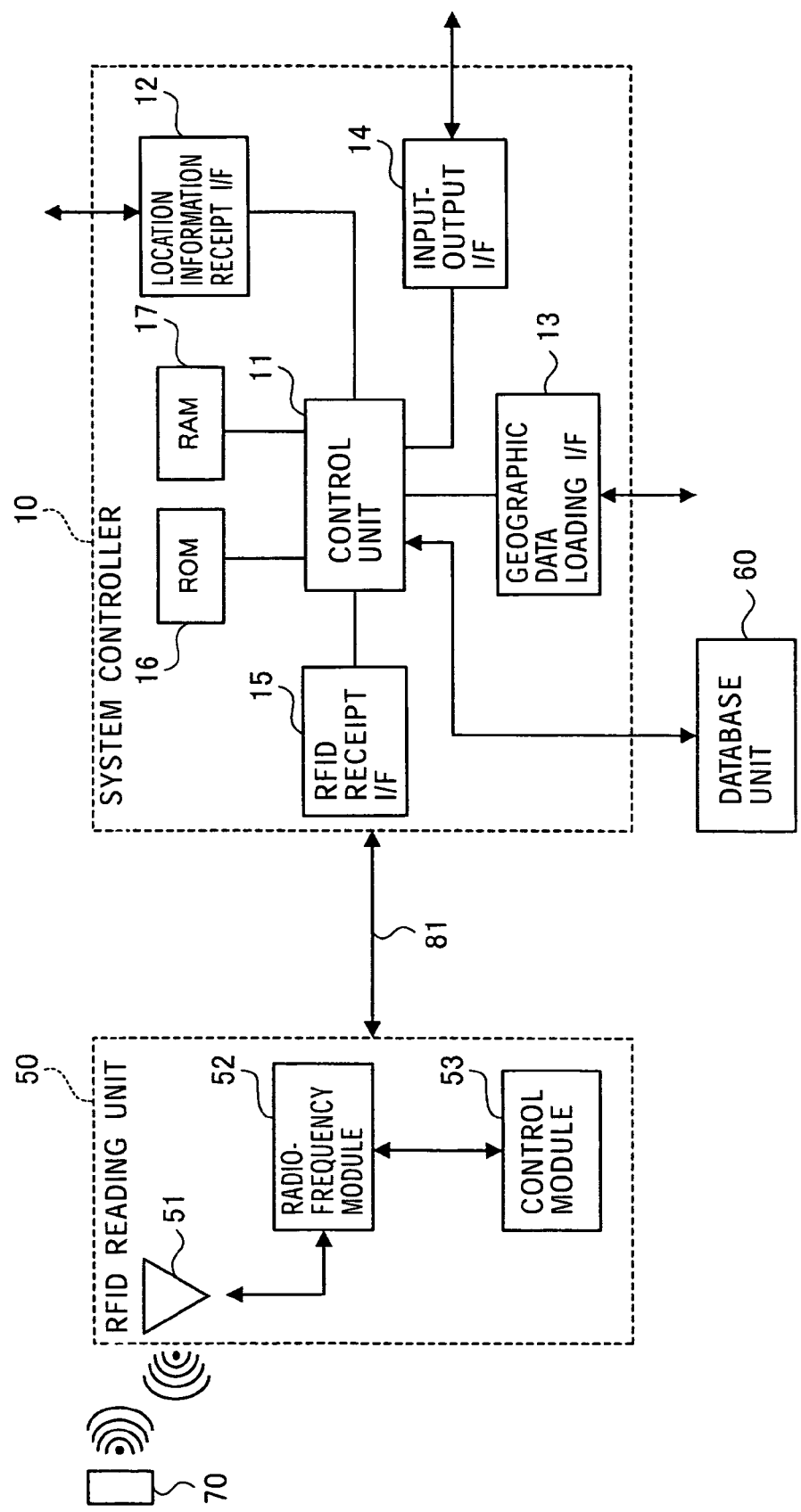
FIG. 2 is a block diagram of structures of a system controller and an RFID reading unit.

FIG. 2 is a block diagram of structures of the system controller 10 and the RFID reading unit 50. The system controller 10 has: a control unit 11 that performs various processing based on received article information; a location information receipt interface (I/F) 12 that receives various location information from the location information measurement unit 20; a geographic data loading I/F 13 that loads geographic data read by the geographic data reading unit 30; an input-output I/F 14 that interacts with the user interface unit 40 to carry out input by the user's instructions, display, and sound output; an RFID receipt I/F 15 that receives article information from the RFID reading unit 50 via an interface 81, such as an RS-232C interface; a ROM 16 that stores programs to be performed by the control unit 11; and a RAM 17 that functions as a working buffer when the control unit 11 conducts a search.

The RFID reading unit 50 has: antennas 51 that are mounted on, for example, both a passenger space and a storage space for radio wave transmission and reception to and from the RFID tags 70; a radio-frequency module 52 that supplies radio waves to be emitted via the antennas 51, converts analog radio waves to digital signals, and outputs the digital signals; and a control module 53 that controls the RFID reading unit 50. The control module 53 has a communication control capability of switching between transmission and reception of the radio-frequency module 52 and detecting errors by, for example, a cyclic redundancy check (CRC). The control module 53 also functions as an interface to the system controller 10.

In the system controller 10, the RFID receipt I/F 15 and the control unit 11 function as means for acquiring article information. The location information receipt I/F 12 and control unit 11 function as means for acquiring location information. The geographic data loading I/F 13 and the control unit 11 function as means for acquiring geographic data. The input-output I/F 14 and the control unit 11 functions as outputting means. The display device 41 in the user interface unit 40, shown in FIG. 1, functions as display means. Moreover, the control unit 11 in the system controller 10 may function as means for selecting a delivery route. The RFID reading unit 50 may be included in the means for acquiring article information. The RFID reading unit 50 may function as means for reading identification signals. Furthermore, the means for acquiring location information may include the location information measurement unit 20, and the means for acquiring geographic data may include the geographic data reading unit 30. The outputting means may include the user interface unit 40. The database unit 60 functions as storing means.

The operation of the vehicle-mounted apparatus 1 described with reference to FIGS. 1 and 2 will be further described referring to flow charts as needed.

For communications, in the RFID reading unit 50, the radio-frequency module 52 sends radio waves to the RFID tags 70 via the antennas 51 under instructions from the control module 53 and thereby supplying energy for responses to the RFID tags 70. The RFID reading unit 50 is then switched from the transmission mode to the reception-capable mode and the radio-frequency module 52 receives RFID signals via the antennas 51. The radio-frequency module 52 converts the received signals to digital signals and performs error-detection on the signals. The acquired RFID signals are transferred to the system controller 10 via the interface 81.

Figure 3:
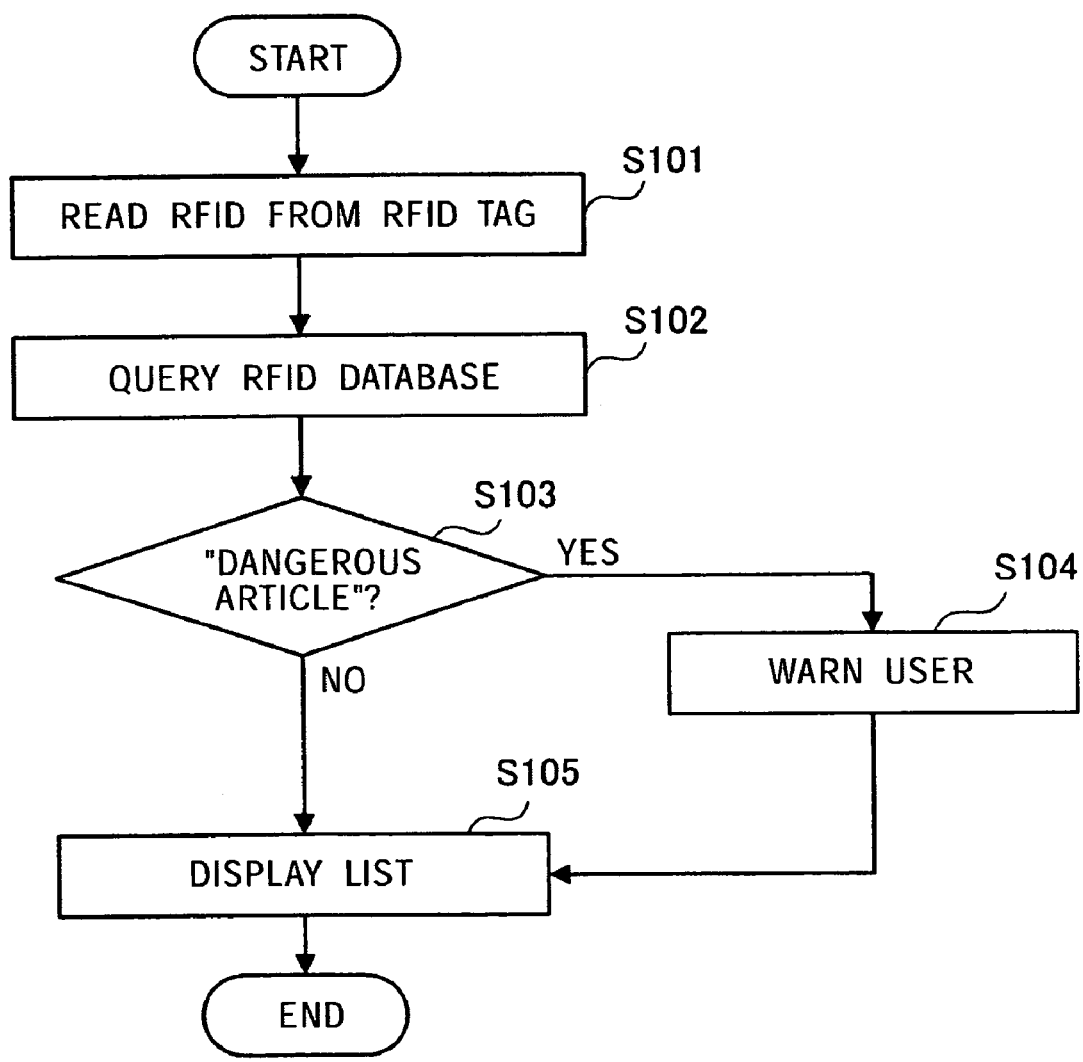
FIG. 3 is a flow chart showing steps of processing performed by a control unit of the system controller.

FIG. 3 is a flow chart showing steps of processing performed by the control unit 11 of the system controller 10. The control unit 11 reads identification signals (RFID signals) acquired from RFID tags attached to articles via the RFID reading unit 50 (step 101). Specifically, the RFID reading unit 50 receives the identification signals (RFID signals) of the articles from the RFID tags 70, which are identification tags attached to the articles placed in a passenger space or a storage space. Then, the control unit 11 reads the RFID signals via the RFID receipt I/F 15. The control unit 11 then queries the RFID database 61 and retrieves article information, including a product name, a producer, a serial number, and a category, corresponding to the read RFID signals (step 102).

The control unit 11 determines whether each of the articles corresponding to the read RFID signals is a "dangerous article" or not when placed in the passenger space or the like on the basis of the retrieved article information (step 103). If there is an article determined to be dangerous, the user is warned (step 104) and processing continues to step 105. If there is no article determined to be dangerous, processing continues to step 105. Examples of the warning operation include displaying a message saying that, for example, "A dangerous article has been left in the passenger space" on the display device 41 or reading aloud the name of the dangerous article by the sound output device 42.

At step 105, a list of articles placed in the passenger space and the storage space appears before processing exits.

Figure 4:
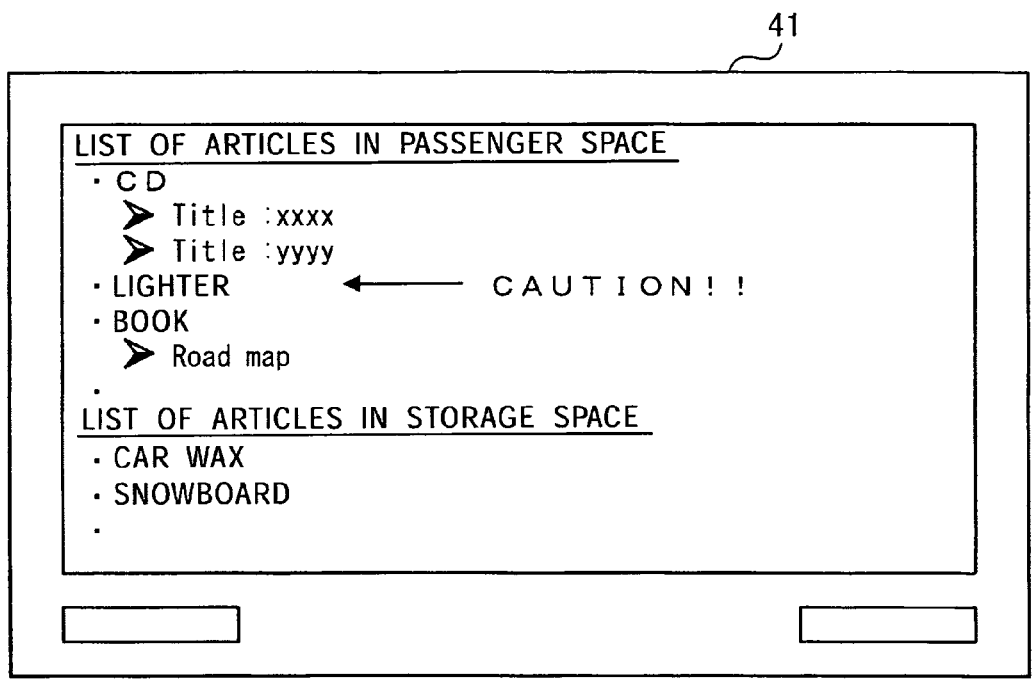
FIG. 4 illustrates a typical list appearing on a display device.

FIG. 4 illustrates a typical list appearing on the display device 41. In FIG. 4, the names of articles corresponding to identified RFIDs are listed so as to be categorized as the passenger space and the storage space. In this example, warning for a found dangerous article is displayed together with the list of all articles. In this time, it is possible to extract and display only user-designated articles. After completing such display operation at step 105, a series of processing shown in FIG. 3 exits.

Process for providing (outputting) article information on the basis of detected location information of a vehicle will now be described below.

In general, a vehicle belongs to a person, and basically, it is up to the owner to decide what articles are brought in the passenger space of the vehicle. In countries or districts having regulations on articles to be brought in the passenger space, however, a predetermined regulation may be imposed on articles placed on the vehicle in the possession of the person. For example, in the United States and Canada, bringing alcoholic drinks into a passenger space of a vehicle is banned. The embodiment of the present invention achieves providing information as to articles appropriately according to a location of a vehicle and conditions.

Figure 5:
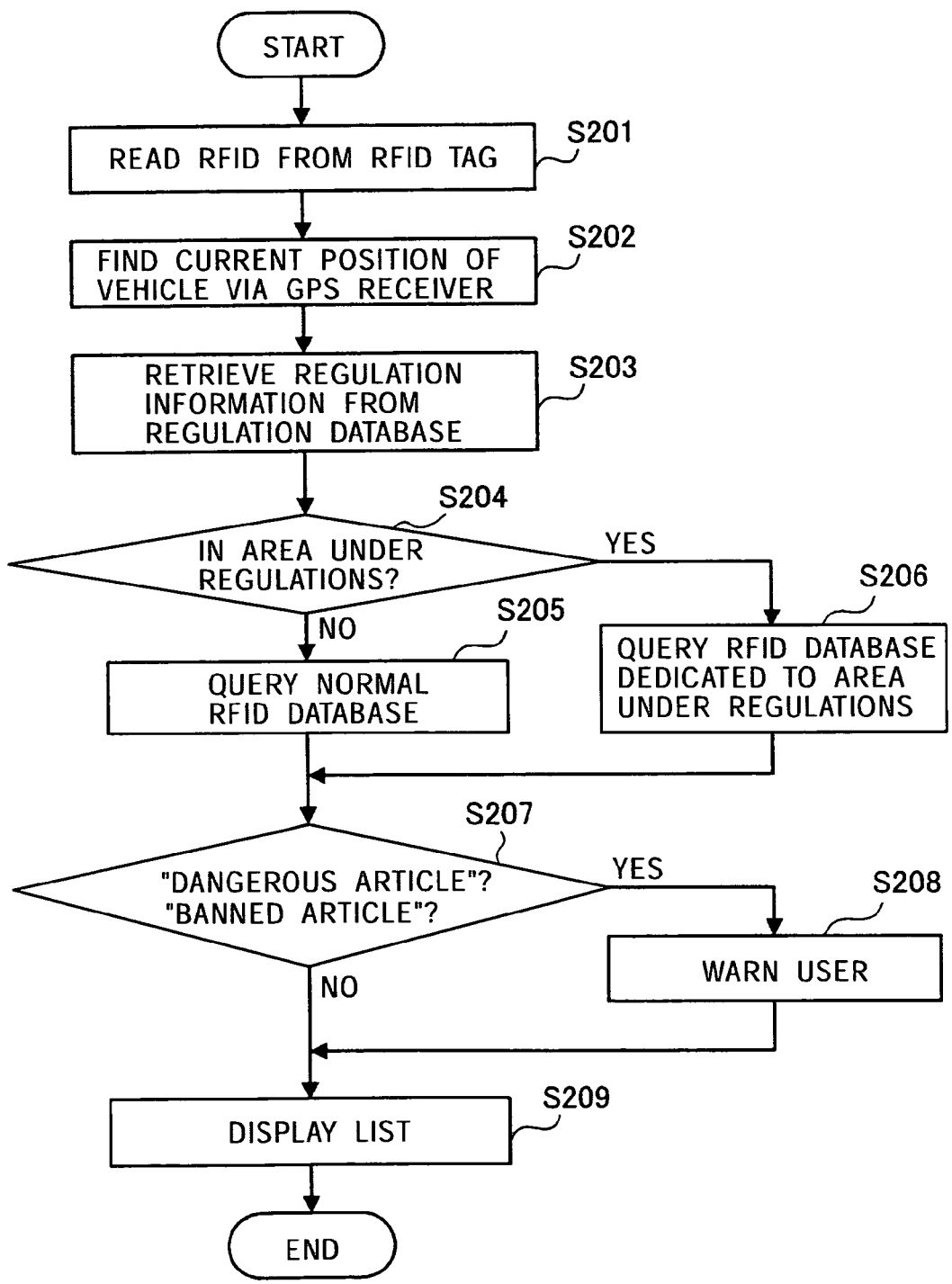
FIG. 5 is a flow chart showing steps of processing performed by the control unit of the system controller for regulations.

FIG. 5 is a flow chart showing steps of processing performed by the control unit 11 of the system controller 10 for regulations. The control unit 11 reads the RFID signals acquired from the RFID tags 70 via the RFID reading unit 50 (step 201). The control unit 11 finds a current position of a vehicle via the GPS receiver 21 of the location information measurement unit 20 (step 202) and retrieves regulation information from the regulation database 62 of the database unit 60 (step 203). The control unit 11 determines whether the vehicle is positioned in an area under regulations, such as a particular country, for example, the United States or Canada, or a particular state or district, on the basis of the found current position and the retrieved regulation information (step 204). If the vehicle is determined to be not positioned in the area under regulations, the control unit 11 queries a normal RFID database 61 and retrieves article information, including a product name, a producer, a serial number, and a category, corresponding to the read RFID signals (step 205) and processing continues to step 207. If the vehicle is determined to be positioned in the area under regulations, the control unit 11 queries an RFID database 61 dedicated to the area under regulations and retrieves article information, including a product name, a producer, a serial number, and a category, corresponding to the read RFID signals (step 206) and then determines whether each of the articles is a "dangerous article" or a "banned article" on the basis of the retrieved article information (step 207). For example, in the United States or Canada, if alcoholic drinks are placed in the vehicle, it is determined that a banned article exists in the vehicle. If it is determined that neither dangerous article nor banned article exists in the vehicle, the control unit 11 performs display based on the retrieved article information on the display device 41 (step 209) and processing exits. If it is determined that a dangerous article and/or a banned article exists in the vehicle, the control unit 11 warns the user by the sound output device 42 or display device 41 (step 208). Processing continues to step 209 and then exits.

According to the embodiment, the nature of each of articles placed in a vehicle is determined and output. For example, if articles that should be treated with caution in a vehicle or that are banned from being brought in the vehicle are placed in the vehicle, a driver is given a caution or is warned so that the driver is protected from an accident and a penalty for violating a law or rule. The driver is warned according to conditions of a country or a district where a vehicle is positioned on the basis of location information via the GPS receiver 21 of the location information measurement unit 20 or the like, so that information is supplied to the user appropriately.

An application of the embodiment to a distribution system will now be described below.

In general, tags in which destinations are entered are attached to delivery articles of home-delivery service or the like. Using RFID tags storing destination information as these delivery tags allows delivery people to keep track of articles placed in a storage space of a vehicle by acquiring their RFID signals. Finding the current position of the vehicle by the location information measurement unit 20 and acquiring location information of destinations from the delivery database 63 enable delivery people to acquire information about the best delivery route selected. In addition, congestion information acquired via the VICS receiver 22 can provide delivery people with a delivery route that achieves the delivery more quickly.

Figure 6:
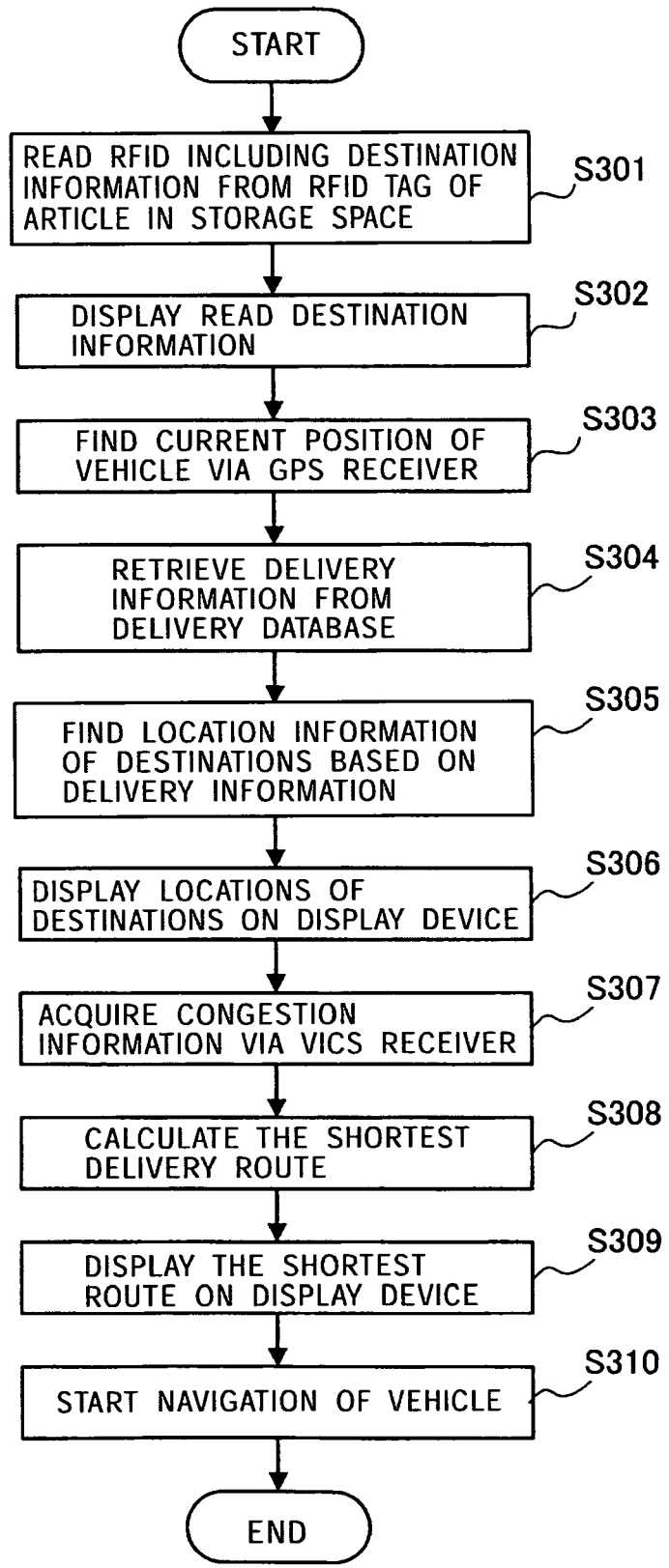
FIG. 6 is a flow chart showing steps of delivery operation.
Figure 7A:
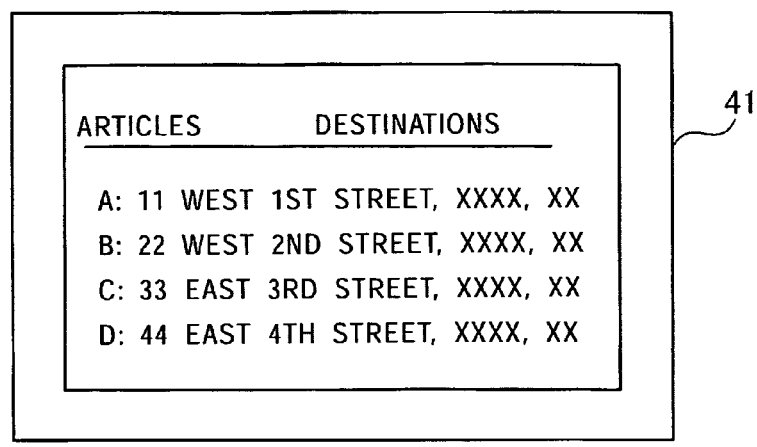
FIGS. 7A and 7B illustrate typical display on the display device in an application of an embodiment to a distribution system.

FIG. 6 is a flow chart showing steps of delivery operation. The RFID reading unit 50 reads RFID signals including destination information from the RFID tags 70 attached to articles placed in the storage space via, for example, one antenna 51 (see FIG. 2) mounted in the storage space (step 301) and outputs the read RFID signals to the control unit 11 of the system controller 10. At this time, the destination information included in the read RFID signals is displayed on the display device 41 (step 302). FIG. 7A illustrates a list appearing on the display device 41 that includes information about articles placed in the storage space. In this example shown in FIG. 7A, the names of four articles A to D and corresponding destinations are displayed individually. The RFID signals may include no destination information. In this case, destination information corresponding to the read RFID signals is stored in, for example, the delivery database 63, and information about articles placed in the storage space is displayed on the basis of destination information read from the delivery database 63.

The control unit 11 finds the current position of the vehicle via the GPS receiver 21 of the location information measurement unit 20 (step 303) and retrieves delivery information from the delivery database 63 of the database unit 60 (step 304). The control unit 11 finds location information of destinations of articles corresponding to the read RFIDs on the basis of the delivery information (step 305) and information about the locations of destinations stored in the RFID tags 70 is displayed on the display device 41 (step 306).

Figure 7B:
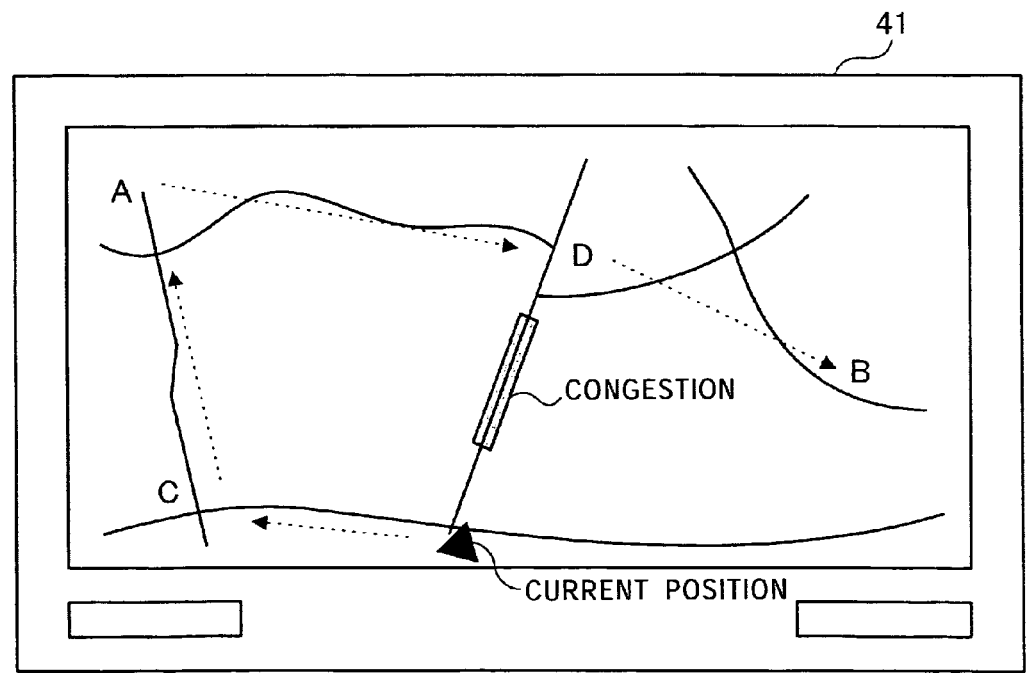

The control unit 11 acquires congestion information from the VICS receiver 22 of the location information measurement unit 20 (step 307). Based on the acquired congestion information, the shortest delivery route is calculated with respect to the displayed location information of destinations (step 308). The calculated shortest route is displayed on the display device 41 (step 309). Then, a navigation of the vehicle to direct the route is started (step 310) and processing exits. FIG. 7B illustrates when the shortest route is displayed for navigating. In this example, the destinations of the articles A to D identified by the RFIDs are plotted on a displayed map read from the geographic data reading unit 30 on the basis of the position measured by the location information measurement unit 20. Assuming that a congestion point is found via the VICS receiver 22 between the current position and the destination of the article D, the system controller 10 searches for a delivery route avoiding the congestion point on the basis of the location information of articles corresponding to the read RFID signals again. The system controller 10 outputs the result to the display device 41. The route avoiding the congestion point is thus displayed on the display device 41, as indicated by dashed lines and arrows in FIG. 7B. The identification by RFIDs applied to delivery operation using a vehicle navigation system achieves a reduction in time required for the delivery.

What is claimed is:

1. A vehicle-mounted apparatus comprising:
   location information measurement means for measuring the location information of a vehicle;
   map data storage means for storing map data;
   map data reading means for reading, from the map data storage means, the map data corresponding to the location information;
   communication means for communicating with an identification tag on an article in the vehicle;
   tag identification means for recognizing the identification tag using the communication means;
   article information storage means for storing information about an article;
   article identification information output means for outputting article information from the article information storage means;
   display means for displaying information output from map data reading means and article identification information output means; and
   information control means for controlling the output of article information and map data.

2. The vehicle-mounted apparatus according to claim 1, wherein the information control means emits a warning sound to warn a user about an article.

3. The vehicle-mounted apparatus according to claim 1, wherein the information stored in the article information storage means is at least one of the product name, the manufacturer's name, the manufacturer's serial number, the type, or the region.

4. The vehicle-mounted apparatus according to claim 1, wherein said communication means transmits to the identification tag and receives an RFID (Radio Frequency Identification) identification signal transmitted from the identification tag.

5. A vehicle-mounted apparatus comprising:
   article information acquiring means for acquiring article information corresponding to an identification signal read from an identification tag attached to an article placed in a vehicle;
   location information acquiring means for acquiring location information about the current position of the vehicle; and
   outputting means for outputting the location information and the article information in combination.

6. The vehicle-mounted apparatus according to claim 5, further comprising identification signal reading means for reading the identification signal from the identification tag attached to the article in the vehicle.

7. The vehicle-mounted apparatus according to claim 5, further comprising storing means for storing the article information associated with the identification signal.

8. The vehicle-mounted apparatus according to claim 5, further comprising:
   geographic data acquiring means for acquiring geographic data based on the location information, wherein the outputting means outputs the geographic data and the article information in combination.

9. A vehicle-mounted apparatus comprising:
   article information acquiring means for acquiring article information corresponding to an identification signal read from an identification tag attached to an article placed in a vehicle;
   geographic data acquiring means for acquiring geographic data that is used for indicating a current position of the moving vehicle; and
   display means for displaying the geographic data and the article information in combination.

10. The vehicle-mounted apparatus according to claim 9, further comprising:
    location information acquiring means for acquiring location information about the current position of the vehicle; and
    delivery route selecting means for selecting a delivery route for delivering the article on the basis of the location information,
    wherein the display means displays the geographic data and the selected delivery route in combination.

11. A method for outputting information about an article placed in a vehicle, the method comprising the steps of:
    acquiring an identification signal from an identification tag attached to the article placed in the vehicle;
    acquiring article information from the identification signal;
    acquiring location information of the vehicle; and
    outputting the article information and the location information in combination.

12. The method for outputting information according to claim 11, further comprising the steps of:
    acquiring geographic data on the basis of the location information; and
    outputting the article information and the geographic data in combination.

* * * * *